United States Patent
Kim et al.

(10) Patent No.: US 12,219,013 B2
(45) Date of Patent: Feb. 4, 2025

(54) APPARATUS AND METHOD FOR SUPPORTING DETERMINISTIC NETWORKING IN WIRELESS COMMUNICATION SYSTEM

(71) Applicant: Electronics and Telecommunications Research Institute, Daejeon (KR)

(72) Inventors: Kyung Soo Kim, Daejeon (KR); Yoo Hwa Kang, Daejeon (KR); Changki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/349,624

(22) Filed: Jul. 10, 2023

(65) Prior Publication Data
US 2024/0048616 A1 Feb. 8, 2024

(30) Foreign Application Priority Data

Aug. 2, 2022 (KR) .................. 10-2022-0096381
Apr. 24, 2023 (KR) .................. 10-2023-0053208

(51) Int. Cl.
*H04L 67/12* (2022.01)
*H04L 47/283* (2022.01)

(52) U.S. Cl.
CPC ............ *H04L 67/12* (2013.01); *H04L 47/283* (2013.01)

(58) Field of Classification Search
CPC .... H04L 41/0823; H04L 67/12; H04W 24/02; H04W 80/10
See application file for complete search history.

(56) References Cited

U.S. PATENT DOCUMENTS

| | | | |
|---|---|---|---|
| 2021/0105665 A1* | 4/2021 | Bennett | ............... H04L 41/082 |
| 2022/0141128 A1 | 5/2022 | Ryoo et al. | |
| 2022/0167287 A1 | 5/2022 | Park et al. | |

(Continued)

FOREIGN PATENT DOCUMENTS

| | | | |
|---|---|---|---|
| KR | 10-2022-0154423 A | 11/2022 | |
| WO | WO-2023079340 A1 * | 5/2023 | |
| WO | WO-2024026028 A2 * | 2/2024 | ............ H04W 24/10 |

OTHER PUBLICATIONS

Mannweiler et al.; H2020-ICT-2016-2 5G—Monarch Project No. 761445, Jun. 30, 2018, Version 1, pp. 1-111 (Year: 2018).*

(Continued)

*Primary Examiner* — Tonia L Dollinger
*Assistant Examiner* — Linh T. Nguyen
(74) *Attorney, Agent, or Firm* — NSIP Law (57) ABSTRACT

Provided is an operation method of a time sensitive communication and time synchronization function (TSCTSF) in a wireless communication system, the operation method including: obtaining a deterministic networking (DetNet) configuration parameter from a first AF outside a service provider network; generating parameter mapping information on the basis of the DetNet configuration parameter; and providing the parameter mapping information to a second AF inside the service provider network, wherein the TSCTSF is a network function for providing the AF outside or inside the service provider network with time sensitive communication and time synchronization services.

17 Claims, 12 Drawing Sheets

(56) References Cited

U.S. PATENT DOCUMENTS

| | | | |
|---|---|---|---|
| 2023/0209371 A1* | 6/2023 | Kang | H04L 41/0823 709/220 |
| 2023/0345264 A1* | 10/2023 | Guduru | H04J 3/0667 |
| 2024/0031978 A1* | 1/2024 | Manolakos | H04W 64/00 |
| 2024/0064558 A1* | 2/2024 | Gangakhedkar | H04L 67/12 |

OTHER PUBLICATIONS

3GPP "Study on 5GS Deterministic Networking (DetNet) interworking" *3GPP TR 23.700-46 V1.0.0 Technical Report, Release 18* https://www.3gpp.org/dynareport?code=23-series.htm, May 2022 (pp. 1-35).

* cited by examiner

APPARATUS AND METHOD FOR SUPPORTING DETERMINISTIC NETWORKING IN WIRELESS COMMUNICATION SYSTEM

CROSS REFERENCE TO RELATED APPLICATION

The present application claims priority to Korean Patent Application No. 10-2022-0096381, filed 2 Aug. 2022, and Korean Patent Application No. 10-2023-0053208, filed 24 Apr. 2023, the entire contents of which are incorporated herein for all purposes by this reference.

BACKGROUND OF THE INVENTION

Field of the Invention

The present disclosure relates to a technology for a wireless communication system. More particularly, the present disclosure relates to an interface and protocol technology for supporting deterministic networking in a wireless communication system.

Description of the Related Art

Figure 1:
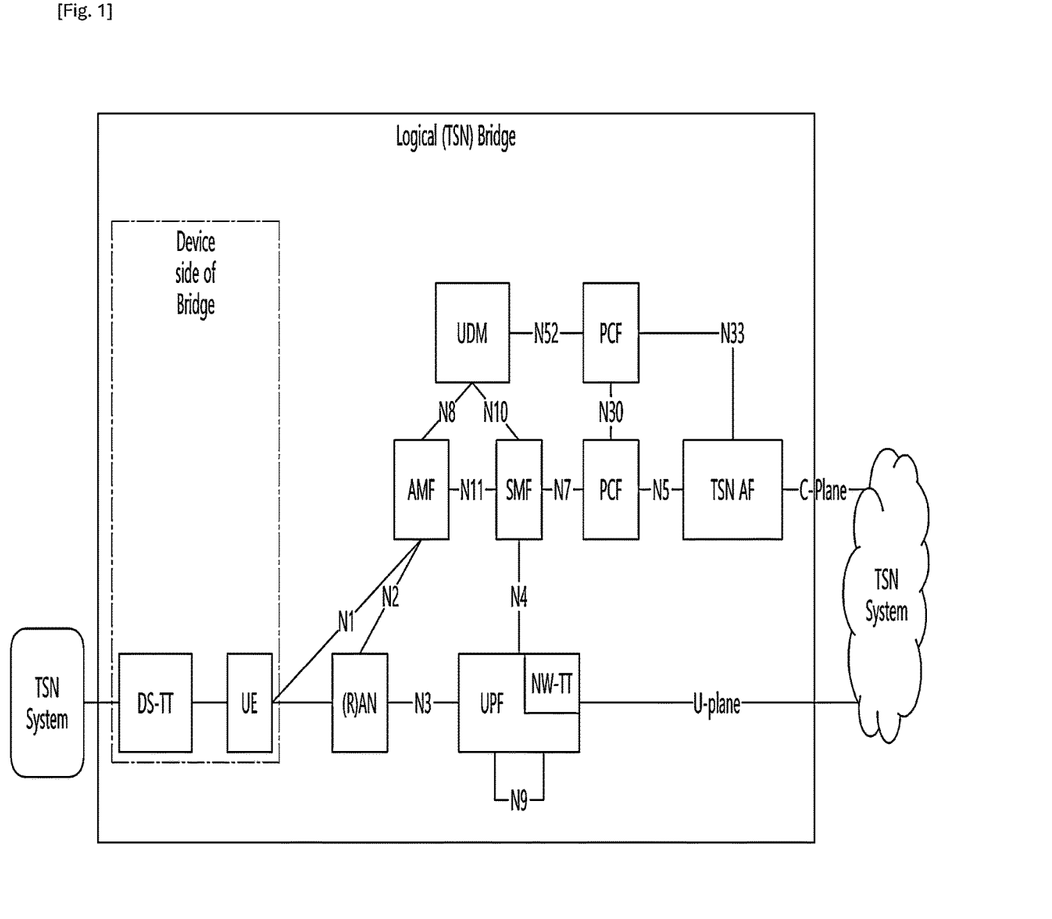
FIG. 1 illustrates a structure of a network in which integrated with a TSN network, a 5GS operates as one logical TSN bridge in a wireless communication system according to an embodiment of the present disclosure.

To provide high-reliability and low-latency services in a 5GS, 3GPP created 5GS standards in Rel-16 that enable a 5GS to operate in conjunction with an IEEE Time Sensitive Networking (TSN) system. FIG. 1 illustrates a structure of a network in which integrated with a TSN network in Rel-16, a 5GS operates as one logical TSN bridge. To be integrated with the TSN network, the 5GS has newly added a TSN application function (TSN AF) at the control plane and a device-side TSN translator (DS-TT) and a network-side TSN translator (NW-TT) at respective opposite ends of the user plane. First, the TSN AF communicates with the centralized network configuration (CNC) that exists in the TSN network, to receive stream information and bridge configuration information for controlling TSN streams. The TSN stream information received by the TSN AF is mapped to the 5G QoS used in the 5GS, and the TSN bridge configuration information is transmitted through a port management information container (PMIC) and a bridge management information container (BMIC) so that the DS-TT/NW-TT can set a port and a bridge. This enables the 5GS to operate as a bridge in the TSN network and to transmit and process TSN streams normally.

Figure 2:
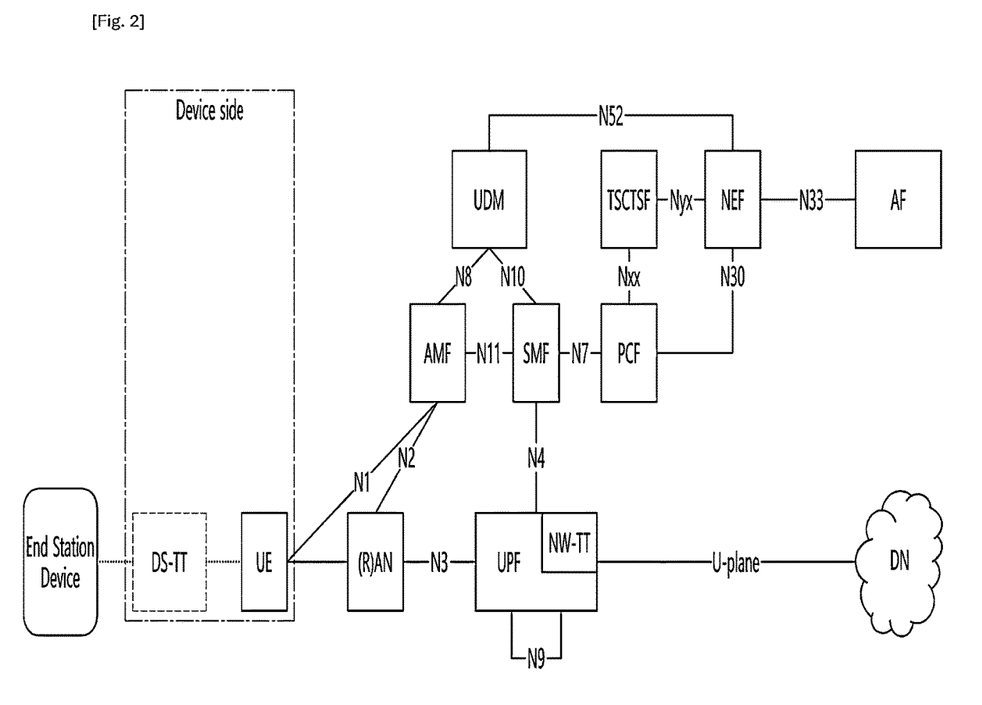
FIG. 2 illustrates a structure of providing a service to an AF inside or outside a service provider network of a TSCTSF in a wireless communication system according to an embodiment of the present disclosure.

3GPP defined a new function, called time sensitive communication and time synchronization function (TSCTSF), in Rel-17 standards to support a growing demand from application services, such as professional video, audio, and an image, for time sensitive communication (TSC) services based on time synchronization. In FIG. 2, the TSCTSF interfaces with a policy control function (PCF), and provides an application function (AF) that is an application service outside a service provider network with time sensitive communication and time synchronization services through a network exposure function (NEF). When an AF exists inside the service provider network, the TSCTSF provides the services through direct connection between the TSCTSF and the AF without the NEF. In 3GPP Rel-16, Ethernet Packet Data Unit (PDU) sessions are used to provide TSC services in TSN networks, but in Rel-17, there is extension to IP PDU sessions for TSC services to be available for various application services. Furthermore, in addition to IEEE 802.1AS time synchronization that works in TSN networks, there is extension to support IEEE 1588 in Rel-17. As a result, the TSCTSF is now capable of providing deterministic QoS-based time sensitive communication and time synchronization services that application services require.

As the range of use of time sensitive communication services provided in a 5GS has been gradually expanded from TSN networks to application services, support for DetNet services, which is a wide-area time-deterministic networking technology, is required to overcome the limitations of TSN short-range time-deterministic networking. IETF DetNet technology is a network layer (L3) technology that ensures lossless transmission of a time-deterministic flow and maximum end-to-end latency time through explicit route setting, resource reservation, and service protection, wherein the technology exists within a single control.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a method of providing an interface and a protocol for transmitting and receiving a DetNet traffic control message between a wireless communication system and a DetNet controller in order to provide a deterministic networking (DetNet) service in the wireless communication system.

According to an embodiment of the present disclosure, there is provided an operation method of a time sensitive communication and time synchronization function (TSCTSF) in a wireless communication system, the operation method including: obtaining a deterministic networking (DetNet) configuration parameter from a first AF outside a service provider network; generating parameter mapping information on the basis of the DetNet configuration parameter; and providing the parameter mapping information to a second AF inside the service provider network, wherein the TSCTSF is a network function for providing the AF outside or inside the service provider network with time sensitive communication and time synchronization services.

In addition, the DetNet configuration parameter may be obtained from the first AF through a network exposure function (NEF).

In addition, the DetNet configuration parameter may be obtained from the first AF on the basis of a Netconf protocol and defined on the basis of a Yet Another Next Generation (YANG) model.

In addition, the DetNet configuration parameter may be obtained from the first AF on the basis of a Restconf protocol and defined on the basis of a Yet Another Next Generation (YANG) model.

In addition, the generating of the parameter mapping information may include mapping DetNet configuration information defined on the basis of the YANG model to a 5G data model available inside a 5G system In addition, the DetNet configuration parameter may be obtained from the first AF on the basis of 5G SBI (RESTful API) and defined on the basis of a 5G data model.

In addition, the first AF may include a DetNet controller, and the second AF may include a PCF.

According to an embodiment of the present disclosure, there is provided an apparatus for a time sensitive communication and time synchronization function (TSCTSF) in a wireless communication system, the apparatus including: a transceiver; and at least one controller operably connected to the transceiver, wherein the at least one controller is configured to obtain a deterministic networking (DetNet) configuration parameter from a first AF outside a service provider network, generate parameter mapping information on the basis of the DetNet configuration parameter, and provide the parameter mapping information to a second AF inside the service provider network, and the TSCTSF is a network function for providing the AF outside or inside the service provider network with time sensitive communication and time synchronization services.

In addition, the DetNet configuration parameter may be obtained from the first AF through a network exposure function (NEF).

In addition, the DetNet configuration parameter may be obtained from the first AF on the basis of a Netconf protocol and defined on the basis of a Yet Another Next Generation (YANG) model.

In addition, the DetNet configuration parameter may be obtained from the first AF on the basis of a Restconf protocol and defined on the basis of a Yet Another Next Generation (YANG) model.

In addition, the at least one controller may be configured to, to generate the parameter mapping information, map DetNet configuration information defined on the basis of the YANG model to a 5G data model available inside a 5G system.

In addition, the DetNet configuration parameter may be obtained from the first AF on the basis of 5G SBI (RESTful API) and defined on the basis of a 5G data model.

In addition, the first AF may include a DetNet controller, and the second AF may include a PCF.

According to an embodiment of the present disclosure, there is provided a wireless communication system including: a time sensitive communication and time synchronization function (TSCTSF); a first AF; and a second AF, wherein the TSCTSF provides the first AF or the second AF with time sensitive communication and time synchronization services, and the first AF is outside a service provider network and includes a deterministic networking (DetNet) controller, and the second AF is inside the service provider network and includes a PCF, and the DetNet controller obtains a DetNet configuration parameter through the TSCTSF, and the TSCTSF is configured to generate parameter mapping information on the basis of the DetNet configuration parameter and provide the parameter mapping information to the PCF.

In addition, the DetNet configuration parameter may be obtained from the first AF through a network exposure function (NEF).

In addition, the DetNet configuration parameter may be obtained from the first AF on the basis of a Netconf protocol and defined on the basis of a Yet Another Next Generation (YANG) model.

In addition, the DetNet configuration parameter may be obtained from the first AF on the basis of a Restconf protocol and defined on the basis of a Yet Another Next Generation (YANG) model.

In addition, the TSCTSF may be configured to, to generate the parameter mapping information, map DetNet configuration information defined on the basis of the YANG model to a data model available inside a 5G system.

In addition, the DetNet configuration parameter may be obtained from the first AF on the basis of 5G SBI (RESTful API) and defined on the basis of a 5G data model.

According to the present disclosure, the DetNet network and the wireless communication system (for example, 5GS) that provide time-deterministic services over broadband are integrated, thereby broadening the range of use of time sensitive communication services used in the 5G system.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The expression "according to some embodiments" or "according to an embodiment" used throughout the specification does not necessarily indicate the same embodiment.

Some embodiments of the present disclosure may be described into functional block components and various processing steps. Some or all of the functional blocks may be realized as any number of hardware and/or software components performing specific functions. For example, functional blocks of the present disclosure may be realized by one or more microprocessors or by circuit components for a predetermined function. In addition, for example, the functional blocks of the present disclosure may be realized in various programing or scripting languages. The functional blocks may be realized as an algorithm running on one or more processors. In addition, the present disclosure may employ conventional techniques for electronic environment setting, signal processing, and/or data processing. The terms "mechanism", "element", "means", and "component" may be widely used, and are not limited to mechanical and physical components.

Furthermore, connecting lines or connecting members between constituent elements shown in the drawings are merely illustrative of functional connections and/or physical or circuit connections. Connections between constituent elements may be represented by various alternative or additional functional connections, physical connections, or circuit connections in a practical device.

Figure 3:
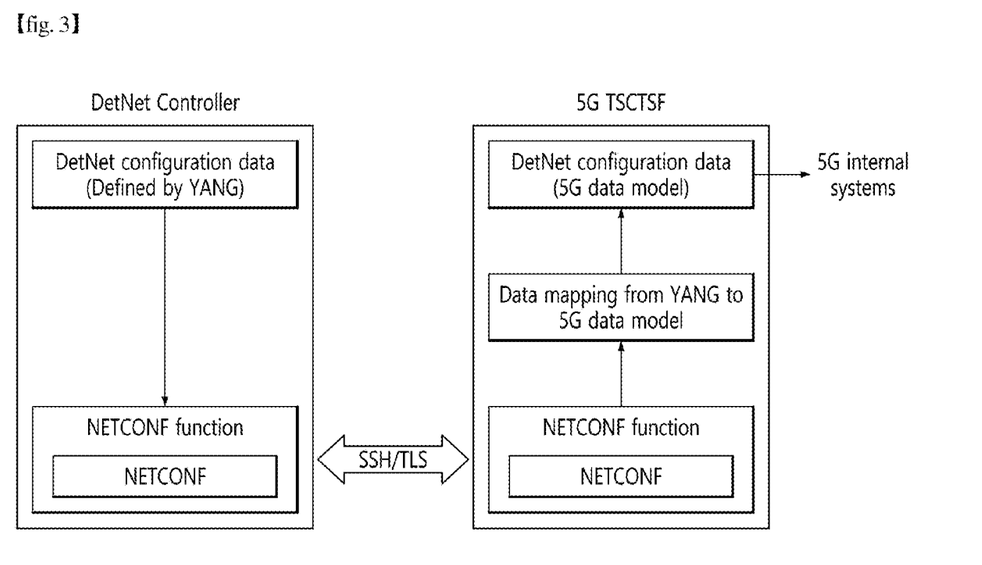
FIG. 3 illustrates a structure of interworking between a DetNet controller and a 5G TSCTSF via a Netconf protocol in a wireless communication system according to an embodiment of the present disclosure.

FIG. 3 illustrates a structure of interworking between a DetNet controller and a 5G TSCTSF via a Netconf protocol in a wireless communication system according to an embodiment of the present disclosure.

The DetNet controller and the time sensitive communication and time synchronization function (TSCTSF) are two important elements of the DetNet network, and the structure of interworking between the DetNet controller and the TSCTSF may be based on the network configuration (Netconf) protocol.

The DetNet controller may be in charge of management and orchestration of the DetNet network as well as network resource configuration and DetNet flow management. Specifically, the DetNet controller communicates with network elements, such as routers and switches, to enable that the network is configured and optimized to meet particular requirements of each DetNet flow. The TSCTSF may be in charge of time sensitive traffic steering. That is, the TSCTSF may manage the distribution of time-sensitive DetNet flows in the network. The TSCTSF may communicate with the DetNet controller to obtain network configuration and traffic steering rules for each DetNet flow.

The structure of interworking between the DetNet controller and the TSCTSF may be based on the Netconf protocol, which is a standard protocol for network configuration and management. Specifically, the DetNet controller and the TSCTSF may use the Netconf protocol to exchange configuration data and management information such as network configuration, traffic steering rules, and state information.

The Netconf may be understood as a protocol that is designed for network provisioning, surpassing limitations of Simple Network Management Protocol (SNMP), which is an existing network management protocol. In addition, the Netconf protocol may use a data model standardized in Yet Another Next Generation (YANG) modeling language defined by the IETF.

Using the Netconf protocol, RPC messages may be encoded in XML.

Referring to FIG. 3, an SSH/TLS-based Netconf protocol may be supported between the DetNet controller and the 5G TSCTSF. The DetNet controller may transmit DetNet configuration information defined by the YANG model to the TSCTSF through the Netconf protocol.

The TSCTSF may map the received DetNet configuration information defined on the basis of the YANG model to a 5G data model available inside the 5G system and may transmit the DetNet configuration information to a PCF, which is a 5G internal system.

Figure 4:
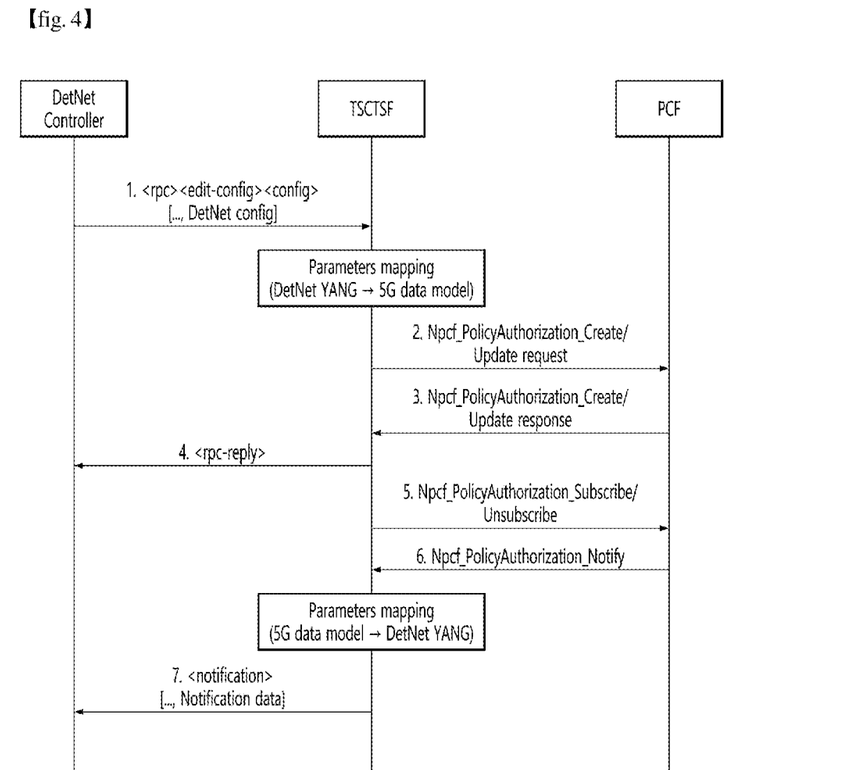
FIG. 4 illustrates a method of transmitting DetNet configuration information in a wireless communication system according to an embodiment of the present disclosure.

FIG. 4 illustrates a method of transmitting DetNet configuration information in a wireless communication system according to an embodiment of the present disclosure.

Referring to FIG. 4, a DetNet controller may transmit DetNet configuration information according to the operation (e.g., <edit-config><config>) defined in a Netconf protocol.

In addition, a TSCTSF may convert received information to a 5G data model and make a request to a PCF for policy authorization, and the PCF generates QoS information on a flow and related PCC rules on the basis of the received DetNet configuration information.

In addition, when it is required to receive information on a particular event, the TSCTSF may subscribe to a related event in the PCF. When notification of the event is received from the PCF, the TSCTSF may perform convertion from the 5G data model into the YANG model and notify the DetNet controller through the Netconf protocol.

Figure 5:
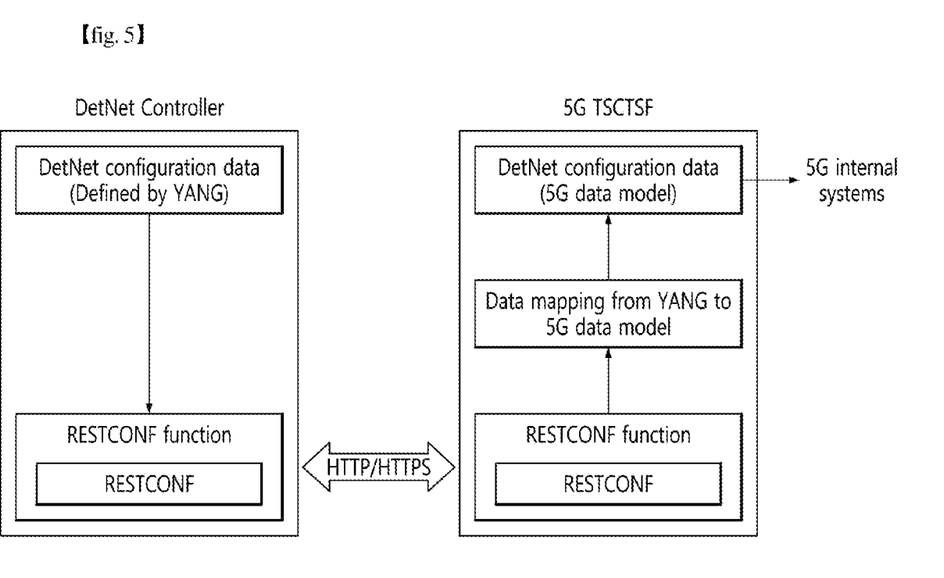
FIG. 5 illustrates a structure of interworking between a DetNet controller and a 5G TSCTSF via a Restconf protocol in a wireless communication system according to an embodiment of the present disclosure.

FIG. 5 illustrates a structure of interworking between a DetNet controller and a 5G TSCTSF via a Restconf protocol in a wireless communication system according to an embodiment of the present disclosure.

The Restconf is an HTTP-based protocol that uses the concept defined in an existing Netconf, and may use the YANG model as a data model in the same manner as the Netconf does. The RESTful API pattern used also by 5G SBI may be used. Using the Restconf protocol, data may be encoded in XML or JSON.

Referring to FIG. 5, the HTTP-based Restconf protocol is supported between the DetNet controller and the 5G TSCTSF, and the DetNet controller transmits DetNet configuration information defined by the YANG model to the TSCTSF through the Restconf protocol. The TSCTSF may map the received DetNet configuration information defined on the basis of the YANG model to a 5G data model available inside the 5G system and may transmit the DetNet configuration information to a PCF, which is a 5G internal system.

Figure 6:
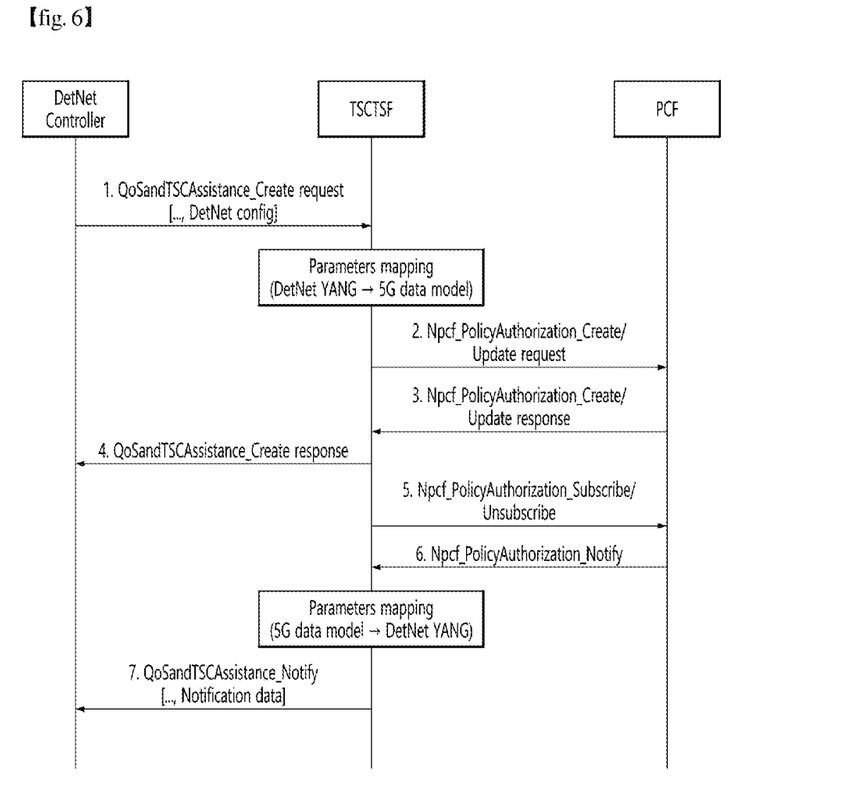
FIG. 6 illustrates a method of transmitting DetNet configuration information in a wireless communication system according to an embodiment of the present disclosure.

FIG. 6 illustrates a method of transmitting DetNet configuration information in a wireless communication system according to an embodiment of the present disclosure.

Referring to FIG. 6, a DetNet controller may transmit DetNet configuration information according to the operation (e.g., QoSandTSCAssistance request/response) defined in a Restconf protocol. Afterward, an interface and event notification between the TSCTSF and the PCF may be processed in the same manner as in FIG. 4.

Figure 7:
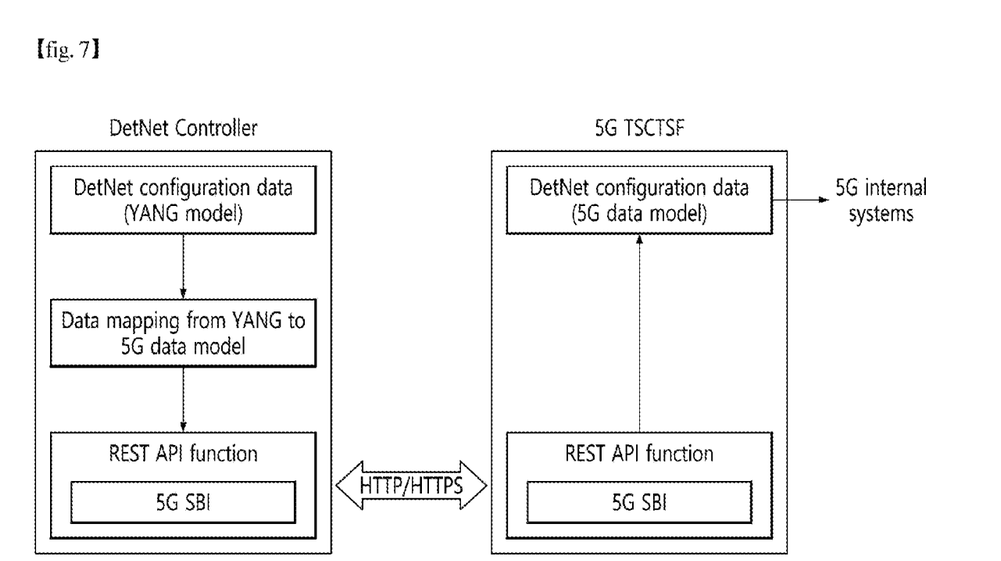
FIG. 7 illustrates a structure of SBI-based interworking between a DetNet controller and a TSCTSF in a wireless communication system according to an embodiment of the present disclosure.

FIG. 7 illustrates a structure of SBI-based interworking between a DetNet controller and a TSCTSF in a wireless communication system according to an embodiment of the present disclosure.

Similarly to the Restconf, the Ntsctsf_QoSandTSCAssistance API of the TSCTSF operates in an HTTP-based RESTful API pattern, but a 5G data model defined by 3GPP may be used as a data model used in an interface.

Referring to FIG. 7, an HTTP-based 5G SBI may be supported between the DetNet controller and the 5G TSCTSF, and the DetNet controller may transmit DetNet configuration information to the TSCTSF, using the 5G data model defined by 3GPP. The TSCTSF may provide the Ntsctsf_QoSandTSCAssistance API and may extend parameters for DetNet configuration. The TSCTSF may transmit the received DetNet configuration information to a PCF, which is an internal system, without data convertion.

Figure 8:
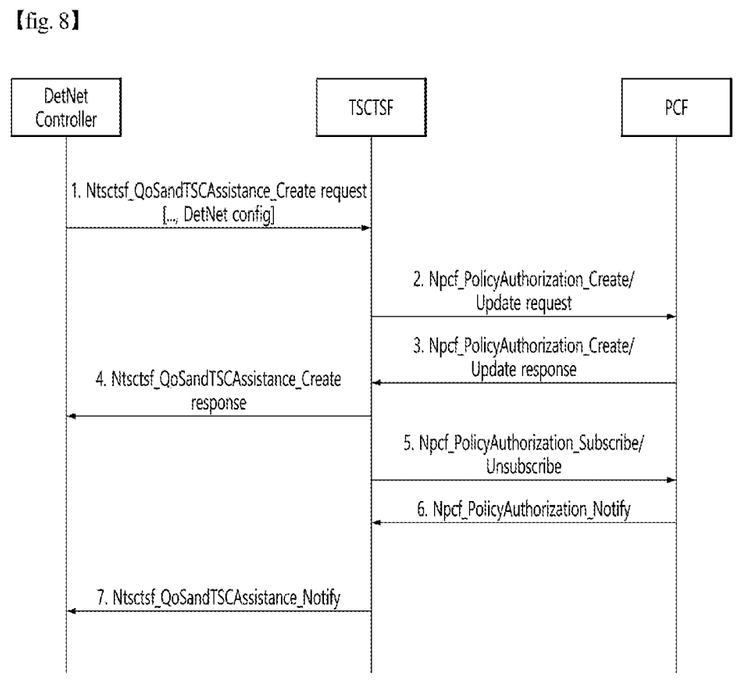
FIG. 8 illustrates a method of transmitting DetNet configuration information in a wireless communication system according to an embodiment of the present disclosure.

FIG. 8 illustrates a method of transmitting DetNet configuration information in a wireless communication system according to an embodiment of the present disclosure.

Referring to FIG. 8, a DetNet controller may define DetNet configuration information with a 5G data model according to a 3GPP SBI transmission method and may transmit the DetNet configuration information to a TSCTSF through the Ntsctsf_QoSandTSCAssistance API. The TSCTSF may make a request to a PCF for policy authorization without any data conversion of received information. The PCF generates QoS information on a flow and related PCC rules on the basis of the received configuration information. When it is required to receive information on a particular event, the TSCTSF may subscribe to a related event in the PCF.

When notification of the event is received from the PCF, the TSCTSF may notify the DetNet controller through Ntsctsf_QoSandTSCAssistance_Notify.

When the DetNet controller exists in a trusted area of the 5GS, direct interworking between the DetNet controller and the TSCTSF may be achieved as shown in FIGS. 3 to 8. A wireless communication system according to an embodiment of the present disclosure optionally provides, when a DetNet controller exists in a trusted area of a 5GS, an interworking method through a network exposure function (NEF) of the 5GS as described later with reference to FIGS. 9 to 11.

Figure 9:
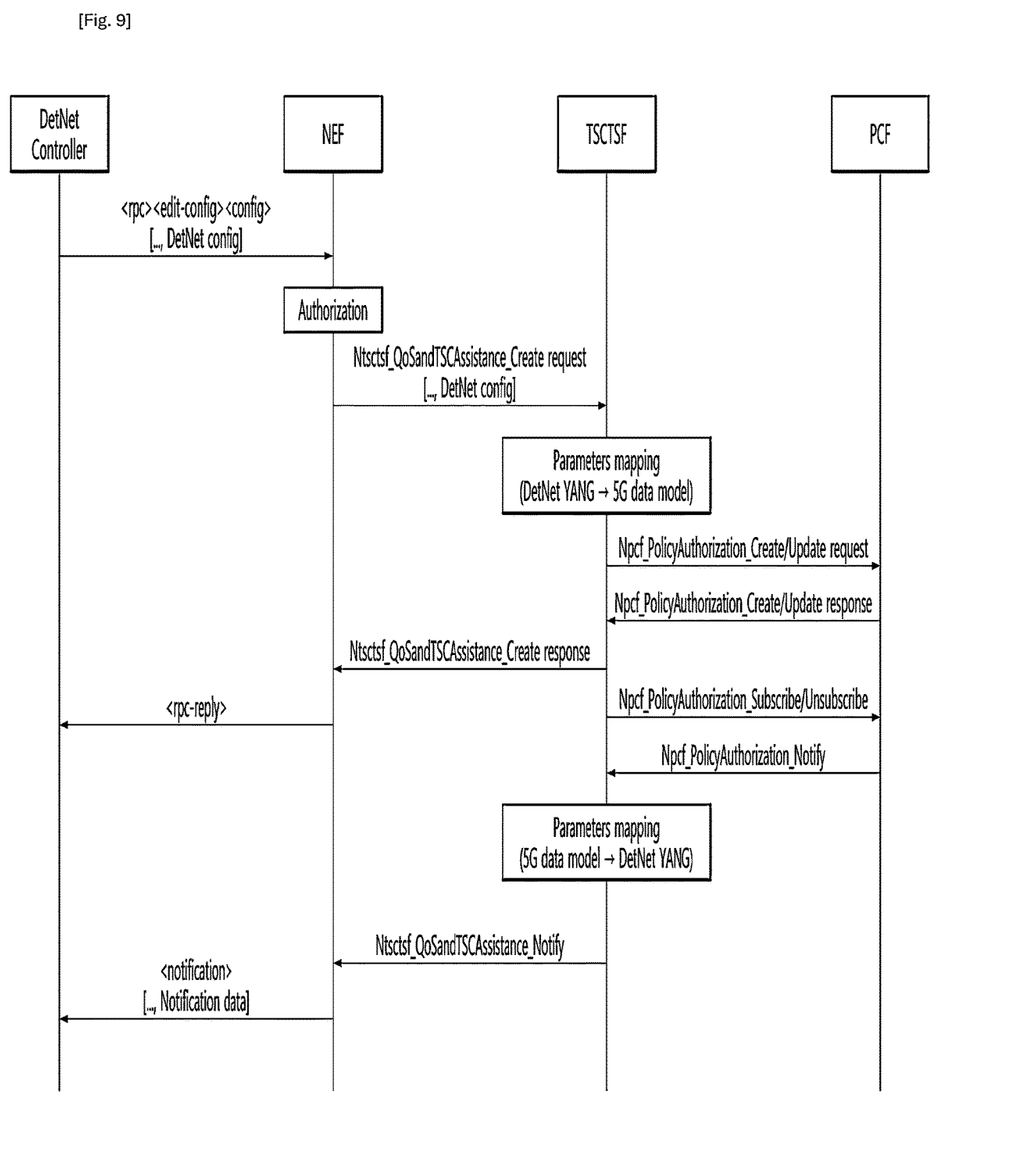
FIG. 9 illustrates a procedure for forwarding and processing DetNet configuration through a Netconf-based NEF in a wireless communication system according to an embodiment of the present disclosure.

FIG. 9 illustrates a procedure for forwarding and processing DetNet configuration information through a Netconf-based NEF in a wireless communication system according to an embodiment of the present disclosure.

Referring to FIG. 9, the NEF may support an SSH/TLS-based Netconf protocol in the same manner as the TSCTSF of FIG. 4 does. A DetNet controller may operate in the same manner as the DetNet controller of FIG. 4 does. Similarly to the operation of an existing NEF, the NEF may perform authorization for a request from the external DetNet controller, and then transmit the received DetNet configuration parameter to an internal TSCTSF, wherein the DetNet configuration parameter is contained in Ntsctsf_QoSandTSCAssistance_Create message, which is an existing SBI interface. Afterward, a forwarding procedure and an event notification procedure between the TSCTSF and the PCF may be the same as those shown in FIG. 4.

Figure 10:
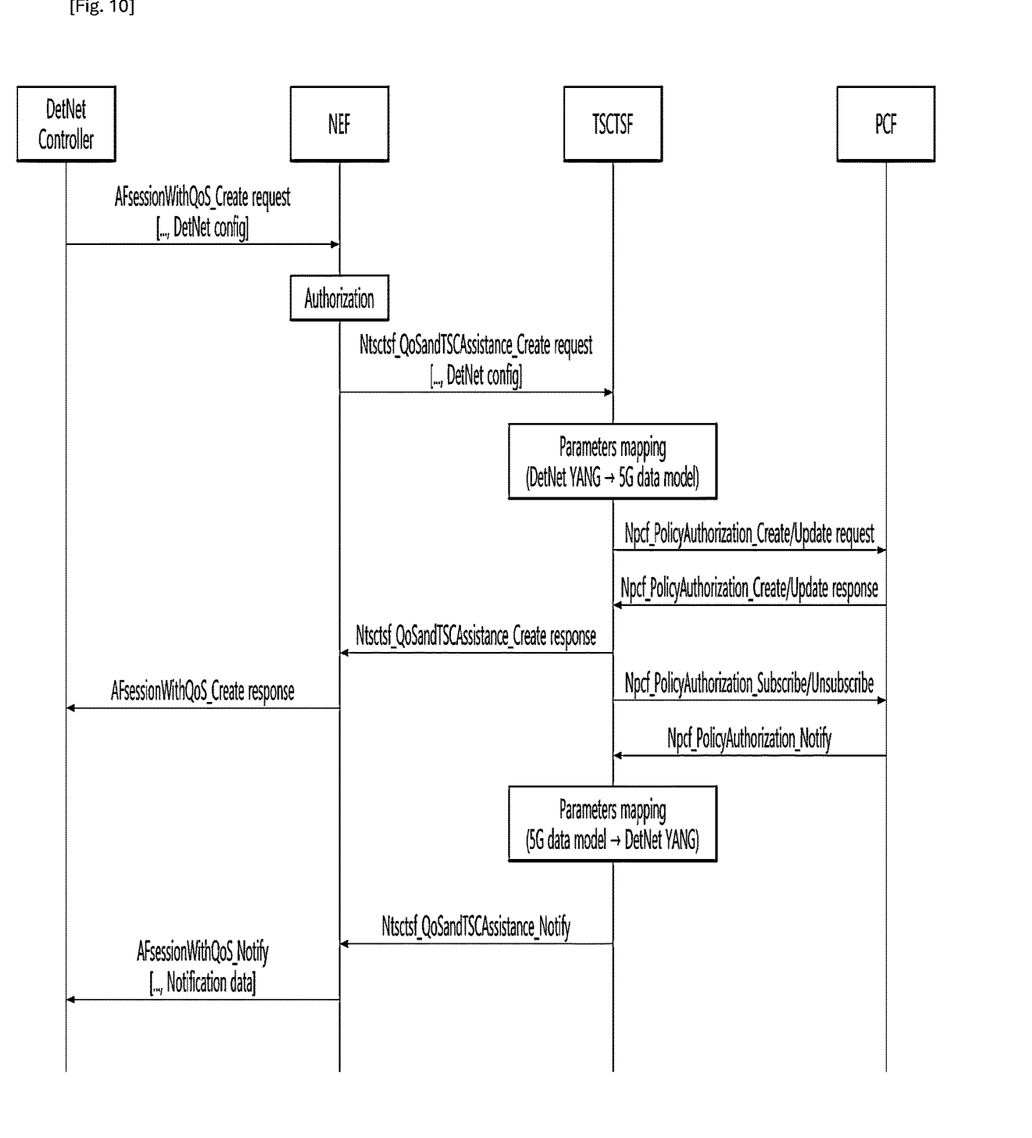
FIG. 10 illustrates a procedure for forwarding and processing DetNet configuration through a Restconf-based NEF in a wireless communication system according to an embodiment of the present disclosure.

FIG. 10 illustrates a procedure for forwarding and processing DetNet configuration information through a Restconf-based NEF in a wireless communication system according to an embodiment of the present disclosure.

Referring to FIG. 10, the NEF may support an HTTP-based Restconf protocol in the same manner as the TSCTSF of FIG. 6 does, and a DetNet controller may operate in the same manner as the DetNet controller of FIG. 6 does. Similarly to the operation of an existing NEF, the NEF may perform authorization for a request from the external DetNet controller, and then transmit the received DetNet configuration parameter to an internal TSCTSF, wherein the DetNet configuration parameter is contained in Ntsctsf_QoSandTSCAssistance_Create message, which is an existing SBI interface. Afterward, a forwarding procedure and an event notification procedure between the TSCTSF and the PCF may be the same as those of FIG. 6.

Figure 11:
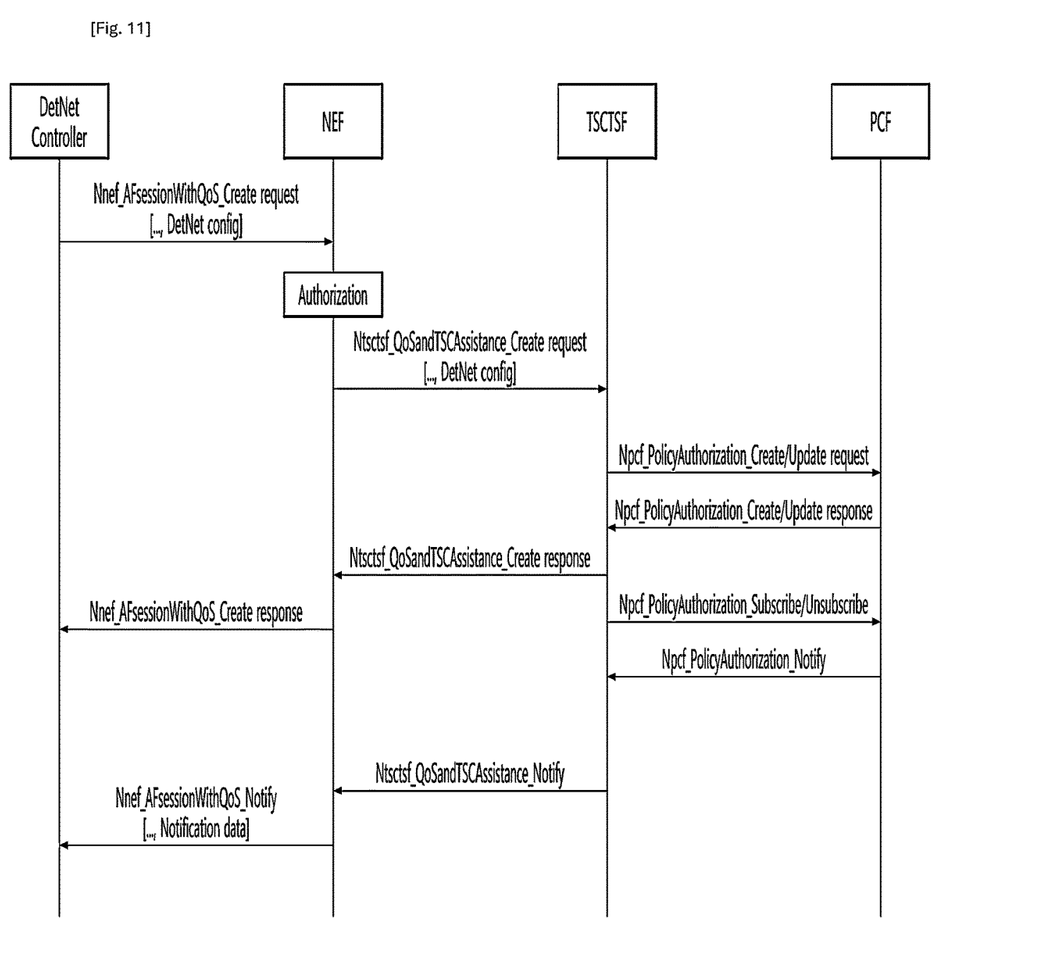
FIG. 11 illustrates a procedure for forwarding and processing DetNet configuration through a 5G SBI-based NEF in a wireless communication system according to an embodiment of the present disclosure.

FIG. 11 illustrates a procedure for forwarding and processing DetNet configuration information through a 5G SBI-based NEF in a wireless communication system according to an embodiment of the present disclosure.

Referring to FIG. 11, the NEF operates similarly to an existing NEF, and a DetNet controller may transmit a DetNet configuration parameter through Nnef_AFsessionWithQoS_Create API of the NEF. The NEF may transmit the received DetNet configuration parameter to a 5G internal system through an API provided by a TSCTSF, and the procedure may be the same as that of FIG. 8.

Figure 12:
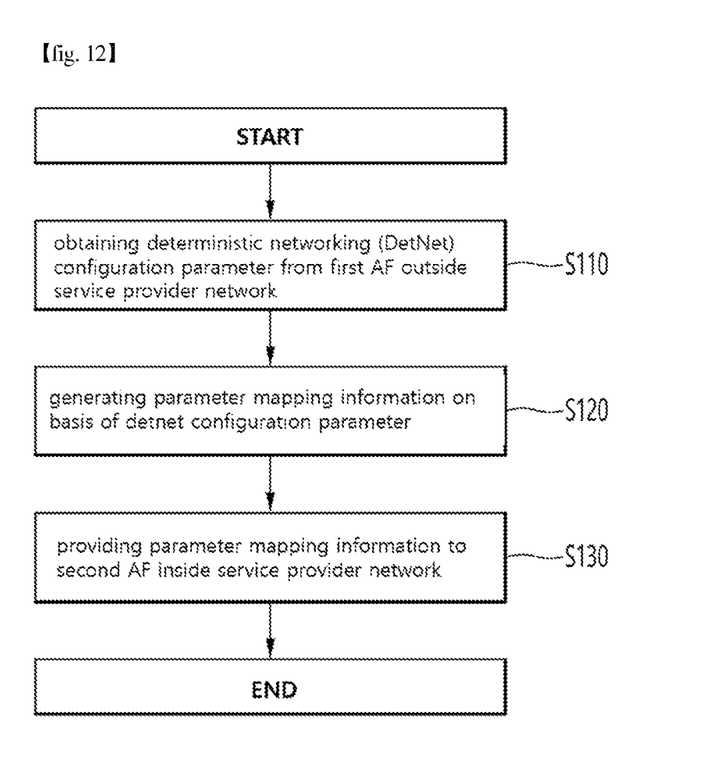
FIG. 12 illustrates a flowchart of the operation of a TSCTSF in a wireless communication system according to an embodiment of the present disclosure.

FIG. 12 illustrates a flowchart of the operation of a TSCTSF in a wireless communication system according to an embodiment of the present disclosure.

In step S110, the TSCTSF may obtain a deterministic networking (DetNet) configuration parameter from a first AF outside a service provider network.

The TSCTSF may be a network function for providing time sensitive communication and time synchronization services to an AF outside or inside the service provider network. In addition, the first AF may include a DetNet controller.

In step S120, the TSCTSF may generate parameter mapping information on the basis of the DetNet configuration parameter.

The DetNet configuration parameter may be obtained from the first AF through a network exposure function (NEF).

In addition, the DetNet configuration parameter may be obtained from the first AF on the basis of a Restconf or Netconf protocol and may be defined on the basis of a Yet Another Next Generation (YANG) model.

In addition, the DetNet configuration parameter may be obtained from the first AF on the basis of 5G SBI (RESTful API) and may be defined on the basis of a 5G data model.

The generating of the parameter mapping information may include mapping the DetNet configuration information defined on the basis of the YANG model to a 5G data model available inside the 5G system.

In step S130, the TSCTSF may provide the parameter mapping information to a second AF outside the service provider network. The second AF may include a PCF.

The embodiments of the present disclosure described above are not realized only through an apparatus and a method, and may be implemented through a program that executes functions corresponding to the configurations of the embodiments of the present disclosure or through a recording medium on which the program is recorded.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

Specific embodiments for implementing the present disclosure have been described. The present disclosure may include the above-described embodiments as well as embodiments simply changed in design or easily changed. In addition, the present disclosure may also include techniques easily modified using the embodiments and implemented. Therefore, the scope of the present disclosure should not be defined as being limited to the embodiments, but should be defined by the appended claims and equivalents thereof.

What is claimed is:

1. An operation method of a time sensitive communication and time synchronization function (TSCTSF) in a wireless communication system, the operation method comprising:
   obtaining a deterministic networking (DetNet) configuration from a first application function (AF) outside a service provider network;
   generating parameter mapping information based on the DetNet configuration; and
   providing the parameter mapping information to a second AF inside the service provider network, wherein the TSCTSF is a network function for providing the AF outside or inside the service provider network with time sensitive communication and time synchronization services, wherein the DetNet configuration is obtained from the first AF based on a Netconf protocol or a Restconf protocol, and wherein the DetNet configuration is defined based on a Yet Another Next Generation (YANG) model.

2. The operation method of claim 1, wherein the DetNet configuration parameter is obtained from the first AF through a network exposure function (NEF).

3. The operation method of claim 1, wherein the generating of the parameter mapping information comprises:
mapping the DetNet configuration parameter defined based on the YANG model to a 5G data model available inside a 5G system.

4. The operation method of claim 1, wherein the DetNet configuration parameter is obtained from the first AF based on 5G service based Interface (SBI) (RESTful API) and defined based on a 5G data model.

5. The operation method of claim 1, wherein the first AF comprises a DetNet controller, and
the second AF comprises a policy control function (PCF).

6. The operation method of claim 1, wherein the first AF comprises a DetNet controller and NEF,
wherein the DetNet configuration is provided to the NEF from the DetNet controller, and
wherein the DetNet configuration is obtained by TSCTSF according to authorization of the NEF.

7. An apparatus for a time sensitive communication and time synchronization function (TSCTSF) in a wireless communication system, the apparatus comprising:
a transceiver; and
at least one controller operably connected to the transceiver,
wherein the at least one controller is configured to:
obtain a deterministic networking (DetNet) configuration parameter from a first application function (AF) outside a service provider network,
generate parameter mapping information based on the DetNet configuration parameter, and
provide the parameter mapping information to a second AF inside the service provider network, and
wherein the TSCTSF is a network function for providing the AF outside or inside the service provider network with time sensitive communication and time synchronization services,
wherein the DetNet configuration parameter is obtained from the first AF based on a Netconf protocol and defined based on a Yet Another Next Generation (YANG) model, and
wherein the DetNet configuration parameter is obtained from the first AF based on a Restconf protocol and defined based on a Yet Another Next Generation (YANG) model.

8. The apparatus of claim 7, wherein the DetNet configuration parameter is obtained from the first AF through a network exposure function (NEF).

9. The apparatus of claim 7, wherein the at least one controller is configured to, to generate the parameter mapping information, map DetNet configuration information defined based on the YANG model to a 5G data model available inside a 5G system.

10. The apparatus of claim 7, wherein the DetNet configuration parameter is obtained from the first AF based on 5G service based Interface (SBI) (RESTful API) and defined based on a 5G data model.

11. The apparatus of claim 7, wherein the first AF comprises a DetNet controller, and
the second AF comprises a policy control function (PCF).

12. The apparatus of claim 7, wherein the first AF comprises a DetNet controller and NEF,
wherein the DetNet configuration is provided to the NEF from the DetNet controller, and
wherein the DetNet configuration is obtained by TSCTSF according to authorization of the NEF.

13. A wireless communication system, comprising:
a transceiver comprising a time sensitive communication and time synchronization function (TSCTSF);
a deterministic networking (DetNet) controller operably connected to the transceiver;
a first application function (AF); and
a second AF,
wherein the transceiver is configured to provide, by the TSCTSF, the first AF or the second AF with time sensitive communication and time synchronization services,
wherein the first AF is outside a service provider network and comprises the deterministic networking (DetNet) controller,
wherein the second AF is inside the service provider network and comprises a policy control function (PCF),
wherein the DetNet controller obtains a DetNet configuration parameter from the transceiver through the TSCTSF,
wherein the TSCTSF is configured to generate parameter mapping information based on the DetNet configuration parameter and provide the parameter mapping information to the PCF,
wherein the DetNet configuration parameter is obtained from the first AF based on a Netconf protocol and defined based on a Yet Another Next Generation (YANG) model, and
wherein the DetNet configuration parameter is obtained from the first AF based on a Restconf protocol and defined based on a Yet Another Next Generation (YANG) model.

14. The wireless communication system of claim 13, wherein the DetNet configuration parameter is obtained from the first AF through a network exposure function (NEF).

15. The wireless communication system of claim 13, wherein the TSCTSF is configured to, to generate the parameter mapping information, map DetNet configuration information defined based on the YANG model to the 5G data model available inside a 5G system.

16. The wireless communication system of claim 13, wherein the DetNet configuration parameter is obtained from the first AF based on 5G Service Based Interface (SBI) (RESTful API) and defined based on a 5G data model.

17. The wireless communication system of claim 13, wherein the first AF comprises a DetNet controller and NEF,
wherein the DetNet configuration is provided to the NEF from the DetNet controller, and
wherein the DetNet configuration is obtained by TSCTSF according to authorization of the NEF.

* * * * *